Jan. 13, 1959   J. T. HAROPULOS   2,868,015
CAPACITIVE STEP LEVEL INDICATOR FOR CONDUCTIVE LIQUIDS
Filed June 30, 1953   3 Sheets-Sheet 1

INVENTOR
JOHN T. HAROPULOS
BY
ATTORNEYS

Jan. 13, 1959    J. T. HAROPULOS    2,868,015
CAPACITIVE STEP LEVEL INDICATOR FOR CONDUCTIVE LIQUIDS
Filed June 30, 1953    3 Sheets-Sheet 2
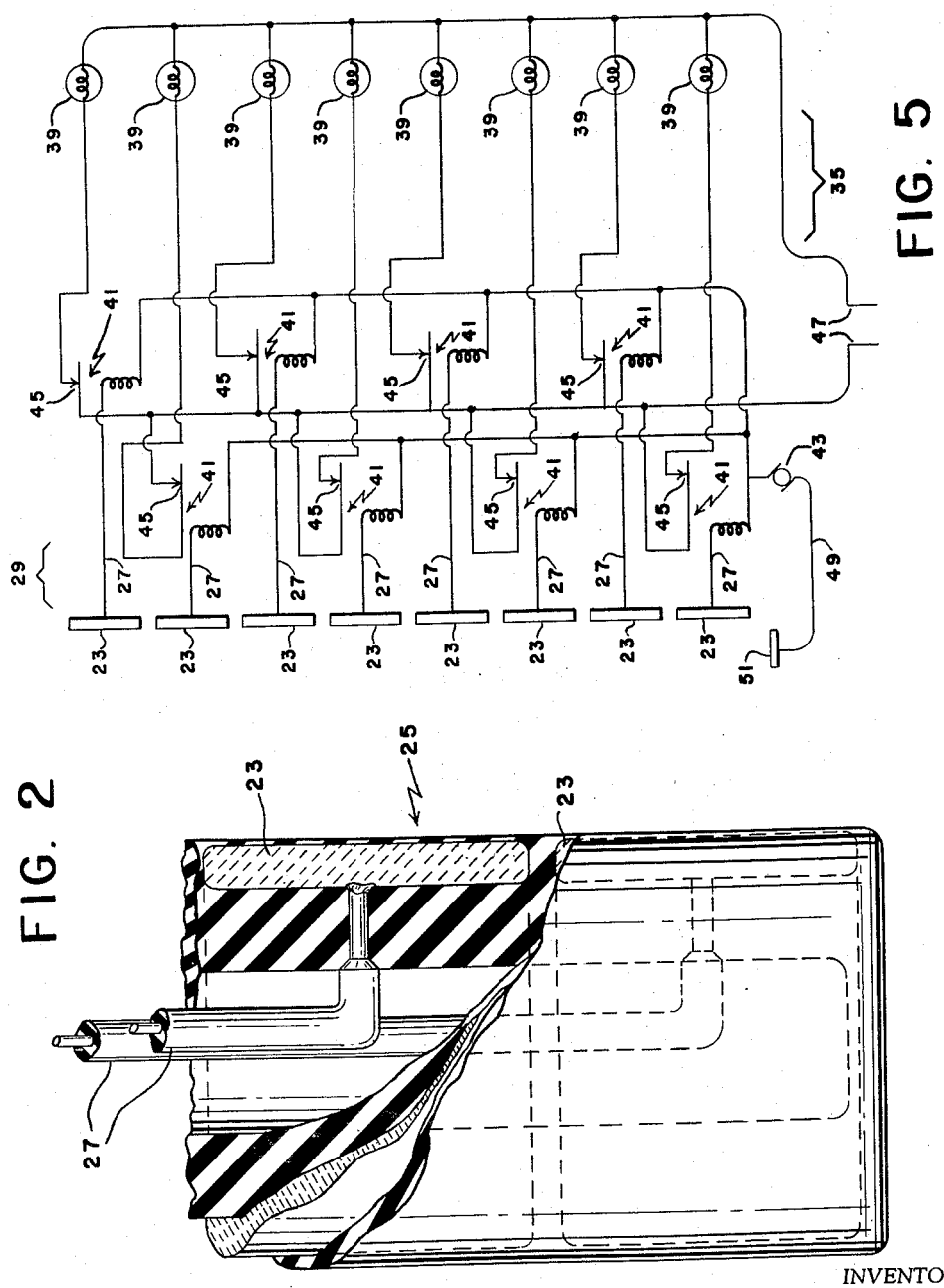
INVENTOR
JOHN T. HAROPULOS
BY
ATTORNEYS Jan. 13, 1959 J. T. HAROPULOS 2,868,015
CAPACITIVE STEP LEVEL INDICATOR FOR CONDUCTIVE LIQUIDS
Filed June 30, 1953 3 Sheets-Sheet 3

INVENTOR
JOHN T. HAROPULOS

BY
ATTORNEYS

United States Patent Office 2,868,015
Patented Jan. 13, 1959

2,868,015
CAPACITIVE STEP LEVEL INDICATOR FOR CONDUCTIVE LIQUIDS

John T. Haropulos, Kensington, Md.

Application June 30, 1953, Serial No. 365,298

2 Claims. (Cl. 73—304)

(Granted under Title 35, U. S. Code (1952), sec. 266)

The invention herein described may be manufactured and used by or for the Government of the United States for governmental purpose without the payment of any royalties thereon or therefor.

The present invention relates to an instrument for indicating the level of a liquid and more particularly to an instrument for indicating at a remote point the level of an electrical conductive liquid.

Liquid level gauges which indicate at remote points have long been known, but when such gauges are submerged in a corrosive liquid which almost all conductive liquids are, they become unreliable. In the case of float gauges, a coating forms on the surface of the float which changes its buoyancy and eventually destroys the float itself. Electrical gauges are similarly affected.

In the present invention a plurality of vertically juxtapositioned insulated plates are secured to the inside of the container of the conductive liquid, and an alternating current is impressed between the several plates and the conductive liquid. When the liquid is adjacent one of the plates, the current through that plate becomes appreciable, and when the liquid is below a plate the current is very slight, so that the current conducted by the individual plates is an indication of the level of the liquid as regards the plates. The exact capacitance of the plates and the liquid is unimportant, as are changes in the capacitance over a long period of time. The system is therefore simple, rugged, and dependable.

It is an object of the present invention to provide a remote indicating level indicator for use with conducting liquids.

It is a further object of the present invention to provide a remote indicating level indicator for use with corrosive liquids which is accurate over extended periods of time.

It is a still further object of the present invention to provide a remote indicating level indicator for use with corrosive liquids employingq a plurality of insulated capacitance plates disposed at different levels relative to the liquid.

Further objects, together with the many attendant advantages of the present invention will be made apparent by reference to the following detailed description and to the appended drawings, in which:

Fig. 2 is an elevational view, partially in section, of the lower end of metering structure of Fig. 1;

Fig. 5 is a schematic wiring diagram illustrating electric circuits of the present invention.

Figure 1:
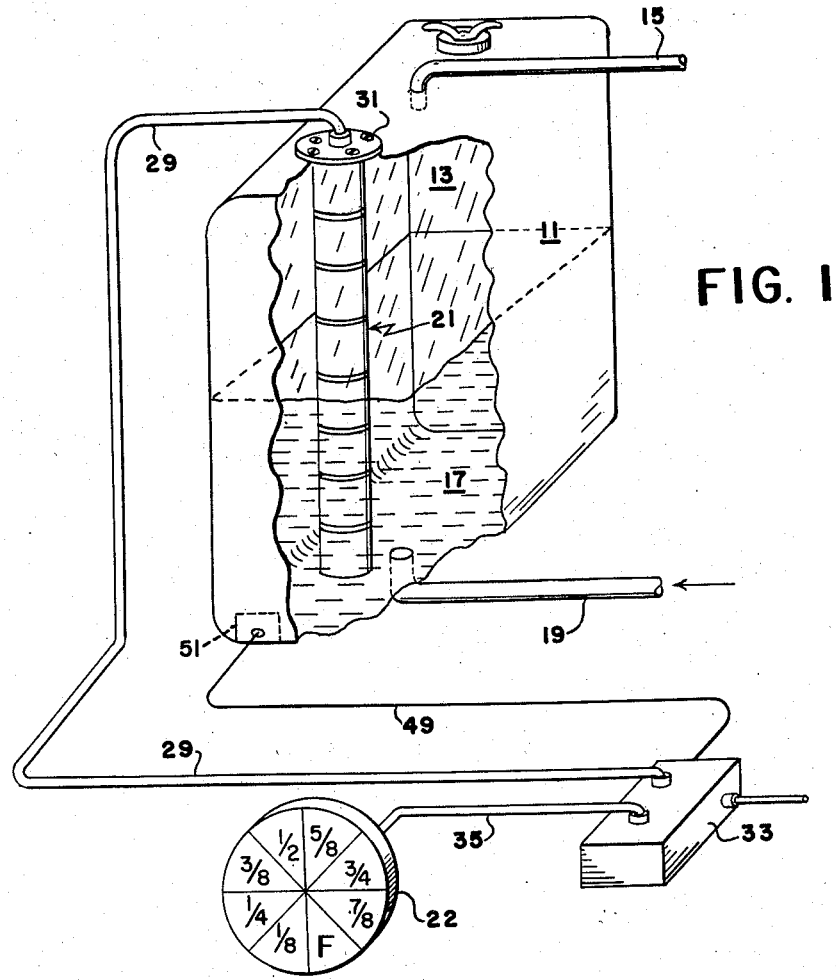
Fig. 1 is a perspective view illustrating one embodiment of the present invention as applied to a storage tank.

Referring now to the drawings, in which like or corresponding parts are indicated by the same number, there is shown in Fig. 1 a fuel storage system such as is used on shipboard, in which the tank 11 is maintained full of liquid at all times. As the fuel 13 is withdrawn from the top through the fuel line 15, sea water 17 is admitted through the line 19. As is well known, petroleum fuel and water do not mix, and the level of the fuel is indicated by the amount of fuel above the water. Such fuel is an insulator, while sea water is a conductive, corrosive liquid. This system is not per se a part of the present invention, and is described only to further a clear understanding of the invention.

The capacitive unit 21 is emerged in the tank 11, and has a length substantially equal to the depth of the tank. As illustrated although not limited thereto, the capacitive element 21 is cylindrical and divided into a plurality of segments which correspond to different liquid levels, the number of segments corresponding to the desired calibration marks on the indicator 22. It will be apparent that a greater number of segments increases the accuracy of the measurement, and may be expanded to any desired number. However, as described herein, eight segments are employed, thus indicating to the nearest eighth the capacity of the tank.

As best seen in Fig. 2, the capacitive element 21 comprises a plurality of conductive segments 23 molded into a tube 25 of insulating material which is relatively unaffected by sea water, a suitable material being synthetic rubber. The segments are connected to a like number of conductors 27 which are brought through the inside of the tube 25 and form the cable 29 shown in Fig. 1. It will be noted that the conductive segments 23 are insulated from each other and from the liquid surrounding the capacitive element 21. The capacitive element 21 may be supported within the tank 11 by any convenient means, such as the flange 31 in Fig. 1.

The cable 29 leads to the control box 33 later to be described and cable 35 runs from the control box 33 to the indicator 22. The indicator 22 is divided into the same number of compartments as the capacitive element 21 has segments and may have any desired shape. The translucent cover 37 is similarly marked, and a signal 39 is positioned in each compartment.

Figure 4:
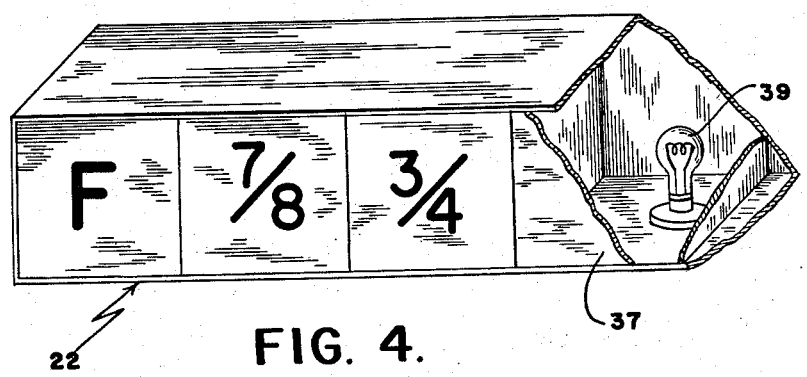
Fig. 4 is a fragmentary view, partially in section, of a modified indicator suitable for use with the present invention.
Figure 3:
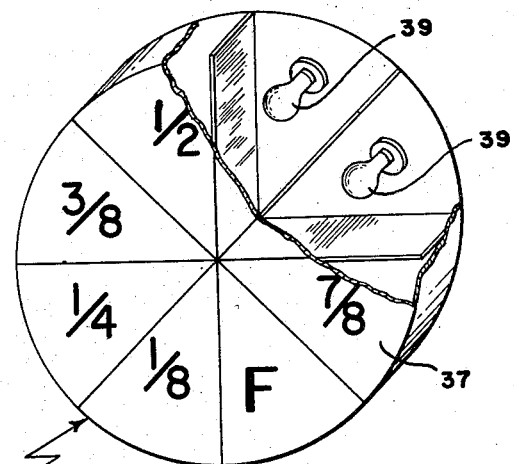
Fig. 3 is a perspective view, partially in section, showing an indicator suitable for use with the present invention.

As illustrated in Fig. 3, the indicator 22 is circular and divided into eight compartments. In the modification illustrated in Fig. 4, a rectangular box is divided into tandem compartments.

The current which each capacitive segment 23 will conduct through capacitance with sea water will depend upon the area of the segment, and the frequency of the alternating current impressed thereon. The design of suitable segments is conventional, and is well-known to those skilled in the art. The frequency to be employed is determined by the available power sources and may be 400 cycles per second, which is frequently available on shipboard, or a higher frequency from a suitable oscillator or generator may be used.

As best seen in Fig. 5, each capacitive segment 23 is connected in series with a sensitive relay 41 and a source of alternating current 43, each relay 41 having normally closed contacts 45. The contacts 45 are in turn connected in series with the lamps 39 and a source of power 47, which may be the same as 43 previously referred to.

The circuit through the capacitive segments 23 and the sensitive relay is completed through the conductor 49 which is connected to the plate 51 within the tank, the sea water 17 serving as a conductor and the complimentary plate of a condenser with the capacitive segment.

In operation, each of the capacitive segments 23 is individually energized through a sensitive relay 41, and the plate 51 completes the circuit to the liquid. If the tank 11 is filled with fuel, the current flow through any relay is too small to operate the relay, and all the lamps 39 are illuminated. However, as fuel is withdrawn, sea water replaces it, and as sea water surrounds a capacitive segment 23, the current through the associated relay 41 increases until that relay is actuated to extinguish the associated lamp 39, this process continuing until the tank 11 is full of sea water and all the lamps are extinguished.

It will be apparent that the device as herein described operates to measure a complimentary quantity rather than the actually desired quantity, or an indirect measurement, and for this reason, normally closed contacts 45 on the relays 41 are used. Where it is desired to directly indicate the level of a conductive liquid, normally open contacts may be employed.

It will be understood that only a preferred modification of the present invention has been described herein and that many modifications are possible without departing from the spirit thereof. It is desired to cover all such modifications as fall within the scope of the appended claims.

What is claimed is:

1. In a remote indicating level gauge for use in a conductive liquid, a capacitive unit at least partially submersed in said liquid comprising a plurality of vertically disposed juxtapositioned capacitive elements each insulated from the remaining capacitive elements and from said liquid to thereby prevent current flow between the elements and contamination of such elements by the liquid, conductive means contacting said conductive liquid, individualized current responsive elements connected to each of said capacitive segments respectively, and a source of alternating current connected to said conductive means and to said current responsive elements.

2. In a remote level indicating gauge for use in a conductive liquid, a capacitive unit at least partially submersed in said liquid comprising a plurality of vertically disposed juxtapositioned capacitive segments, said capacitive segments being insulated from each other and from said liquid to thereby prevent current flow between the elements and inhibit corrosion thereof by the liquid, a conductive member contacting said liquid, individualized relay means having two terminals, means connecting one terminal of said relay means to a respective one of said capacitive segments, a source of alternating current connected to said conductive member and to the other terminals of said relay means, contact means on each of said relays, a plurality of lamps, a source of electric power, and means connecting said contact means of each of said relay means in series circuit relation with one of said lamps and said source of electric power.

References Cited in the file of this patent

UNITED STATES PATENTS

| | | |
|---|---|---|
| 1,127,084 | Ogilvie et al. | Feb. 2, 1915 |
| 2,233,297 | Polin et al. | Feb. 25, 1941 |
| 2,375,084 | Coroniti et al. | May 1, 1945 |
| 2,428,898 | Waymouth | Oct. 14, 1947 |
| 2,589,714 | Lee | Mar. 18, 1952 |
| 2,622,442 | Boisblanc | Dec. 23, 1952 |